(12) United States Patent
Huang

(10) Patent No.: US 6,591,724 B2
(45) Date of Patent: Jul. 15, 2003

(54) STRUCTURE FOR SAW CLIP

(76) Inventor: Chiu-Chiang Huang, No. 13, Lane 395, Sec. 1, Li Min Rd., Nan Chun Area, Taichung (TW)

( * ) Notice: Subject to any disclaimer, the term of this patent is extended or adjusted under 35 U.S.C. 154(b) by 57 days.

(21) Appl. No.: 09/789,507

(22) Filed: Feb. 22, 2001

(65) Prior Publication Data
US 2002/0112715 A1 Aug. 22, 2002

(51) Int. Cl.7 .................................................. B26D 7/02
(52) U.S. Cl. ........................ 83/468.3; 83/466; 83/468.7; 83/477.2; 83/581; 83/462; 83/464; 269/303; 269/319
(58) Field of Search .......................... 83/438, 440, 452, 83/441.1, 459, 464, 466, 468.3, 468.7, 477.2, 581, 462, 468.2, 468, 468.4, 468.6, 453; 269/10, 36, 60, 151, 256, 204, 181, 258, 303, 315, 319

(56) References Cited

U.S. PATENT DOCUMENTS

| 857,345 A | * | 6/1907 | Hill et al. ..................... 83/465 |
| 2,260,421 A | * | 10/1941 | Tracy ........................... 200/47 |
| 2,285,897 A | * | 6/1942 | Campbell .................... 269/303 |
| 4,433,600 A | * | 2/1984 | Ikeda ........................... 144/217 |
| 4,464,962 A | * | 8/1984 | Myhre .......................... 83/425 |
| 4,593,590 A | * | 6/1986 | Gray .......................... 83/435.2 |
| 4,974,306 A | * | 12/1990 | Cole et al. ..................... 29/434 |
| 5,483,858 A | * | 1/1996 | Chen ........................... 269/303 |
| 5,720,096 A | * | 2/1998 | Dorsey ........................ 269/204 |
| 6,260,460 B1 | * | 7/2001 | Shibata et al. ............. 83/468.3 |

* cited by examiner

Primary Examiner—Boyer D. Ashley
(74) Attorney, Agent, or Firm—Browdy and Neimark, P.L.L.C.

(57) ABSTRACT

This invention is an improved structure for saw clip. On the working desk, there is a lead trough. On the pivot of this working desk, there is a block section for items to wait to be sawed. A top pusher block, when moved onwards, can be used to fix the items so that the sawing process can go smoothly. Among the parts of this invention, there is a sliding trough on top of the block and the sliding trough and the lead trough go across each other. Moreover, a lead screw goes through both the sliding trough and lead trough. The lead screw can be adjusted to be at any position in the lead trough to change how the block is placed. Then, the block can be screwed tightly so that it will not turn upon receiving the pushing force from clipping.

7 Claims, 4 Drawing Sheets

STRUCTURE FOR SAW CLIP

BACKGROUND OF THE INVENTION

This invention is related to round saw, especially an improved structure for the saw clip.

Please refer to FIG. 1 to see the diagram from the top of traditional round saw. The structure includes a working desk (1), a block (2), a top pusher (3) and a sawing device (now shown in the figure). The block (2) is connected to the pivot of the working desk (1) through a pivotal screw (4). On the top of block (2), there is a trough in a shape of an arc (5). A fixed screw (6) goes through the arc trough (5) to push the block (2) to a pre-set angle so that the block (2) can be positioned tightly and will not turn or slide away. One end of the top pusher (3) can be connected to a lead shaft (7) that can move in a direction of a straight line with a turning setup. When item a is placed in between the block (2) and the top pusher (3), the lead shaft (7) will be controlled to go forward to push the top pusher (3) so that item a will be pushed closely to the block (2). Then, Item a will be fixed for a sawing blade (8) to saw.

However, when the block (2) is placed in a slanted manner for item a to dock (as shown in FIG. 1), the top pusher (3) exerts a force f on item a. When the angle of the block (2) becomes more slanted, the pressure-exerting arm formed between the pivotal shaft (4) and force f will also increase. Similarly, the torque will increase, too. Nevertheless, the pressure-resisting arm formed to go against the previous torque between the fixed screw and the pivotal screw is always fixed. Therefore, if item a is scheduled to be sawed with a certain degree of tilt, the block (2) will be adjusted to a pre-set position. Then, the pressure-exerting arm will increase and yet the pressure-resisting arm remains fixed. As a result, it is very easy for the block (2) to move under the push of force f. This might result in an inaccuracy in the sawing angle or even put the worker under danger of a loosened sawing blade.

For reasons mentioned above, the author has gathered his years of experiences in the manufacturing and R&D of round saw to design this invention.

The purpose of this invention is to provide an improved structure of round saw clip so that it can fix items to be sawed in any angles for the task to continue.

To achieve purposes mentioned, this invention provides an improved structure of round saw clip. This invention includes the following parts. First, it has a working desk with a lead trough and a cutting trough. Then, there is a block (with a sliding trough) screwed to the top of the working desk with a wall for placing the items to be sawed. The sliding trough goes across the lead trough. Moreover, a lead screw goes through both the sliding trough and lead trough on the block. The lead screw can be adjusted to be at any position in the lead trough to change how the block is placed. Finally, there is a top pusher to exert a pushing force on the items waiting to be sawed so that the items can be clipped and fixed in between the top pusher and the block.

BRIEF DESCRIPTION OF THE DRAWINGS

Descriptions below show how this invention is used in practice with the detailed illustrations of the following figures.

DETAILED DESCRIPTION OF THE INVENTION

Figure 1:
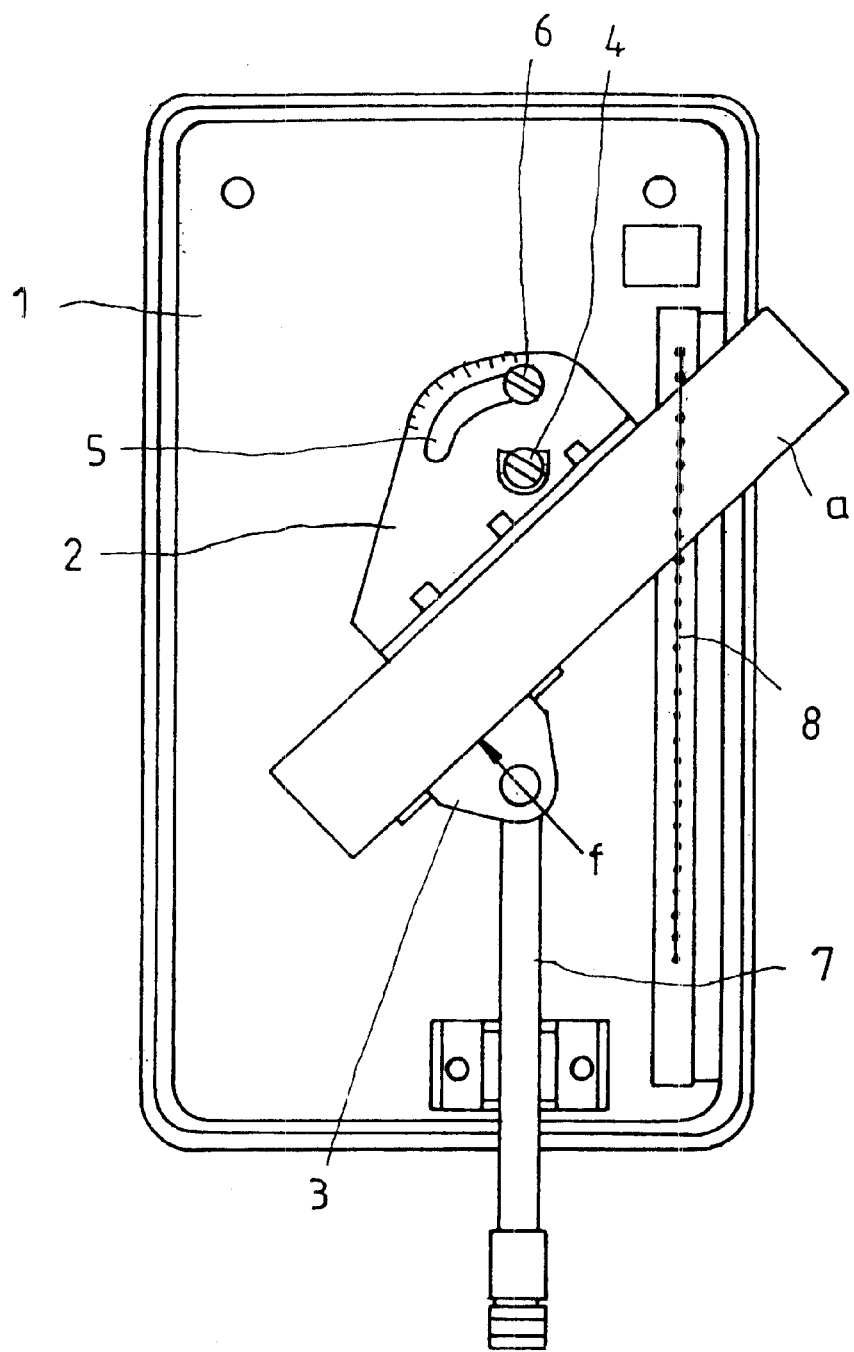
FIG. 1 is the structural diagram of traditional round saw.
Figure 2:
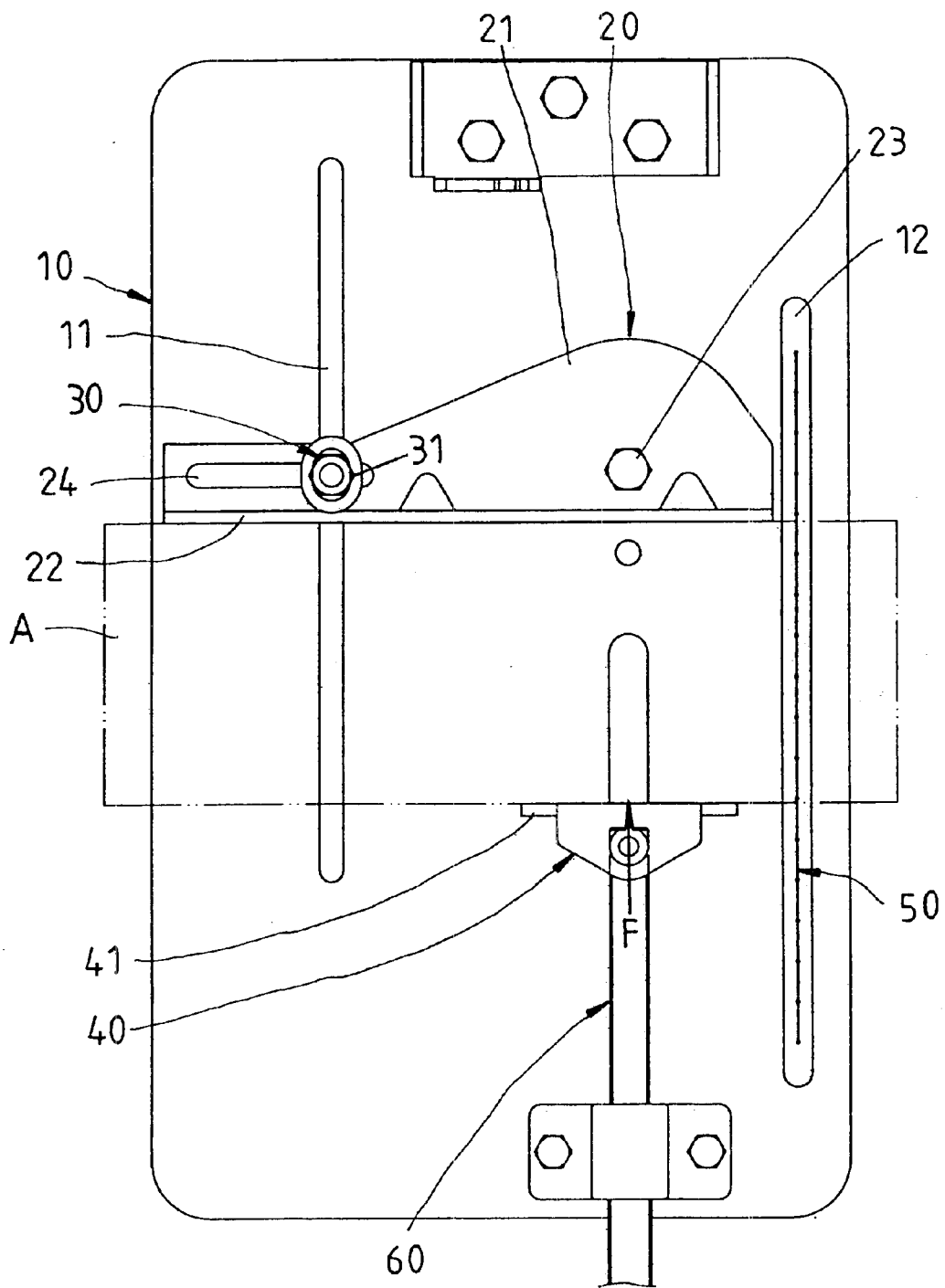
FIG. 2 is the structural diagram of a better example of this invention in use.

Please refer to FIG. 2. This invention of an improved structure of round saw clip includes parts such as a working desk (10), a block (20), a lead screw, and a top pusher (40). Among these parts, On one side of the working desk, there is a sawing device (not shown in the figure). The sawing device includes a sawing blade (50) and can be used to saw item A. Moreover, parallel to the working desk (10), there is a long lead trough (11) and a long cutting trough (12). The cutting trough corresponds to the sawing blade (50).

The block (20) is in a shape of letter "L." It has a piece of horizontal board (21) and a vertical blocking wall 922). Install a pivotal screw (23) on top of the horizontal board (21) so that the block (20) can be connected to the working desk (10) in a rotating manner. The pivotal point is located in between the lead trough (11) and the cutting trough (12).

Moreover, on the horizontal board (21) of the block (20), there is a sliding trough (24), parallel to the blocking wall (22). The sliding trough (24) goes across the lead trough (11) on the working desk (10). The blocking wall (22) can be used for placing item A before it is sawed.

The lead screw (30) goes through the sliding trough (24) on the block (20) and the lead trough (11) on the working desk (11). The function of the lead screw can be screwed tight or loosened up. When the lead screw (30) is loosened, the lead screw can move along the lead trough (11) and change its position on the sliding trough (24). At the same time, this movement will also turn the block (20) so that the blocking wall (22) can be placed in a pre-set angle. When the lead screw (30) is screwed tightly, it will fix the block (20) stably to the working desk (10).

One end of the top pusher (40) can be connected to a lead spiral shaft (60). Then, when the lead spiral shaft (60) moves ahead, the edge (41) will touch item A waiting to be sawed. Moreover, such an arrangement will exert a clipping force F onto item A and ensure item A is fixed firmly between the top pusher (40) and the block (20).

Above is the illustration and description of the parts of this improved round saw clip. Next, please see the following instructions for the use of this invention.

Figure 3:
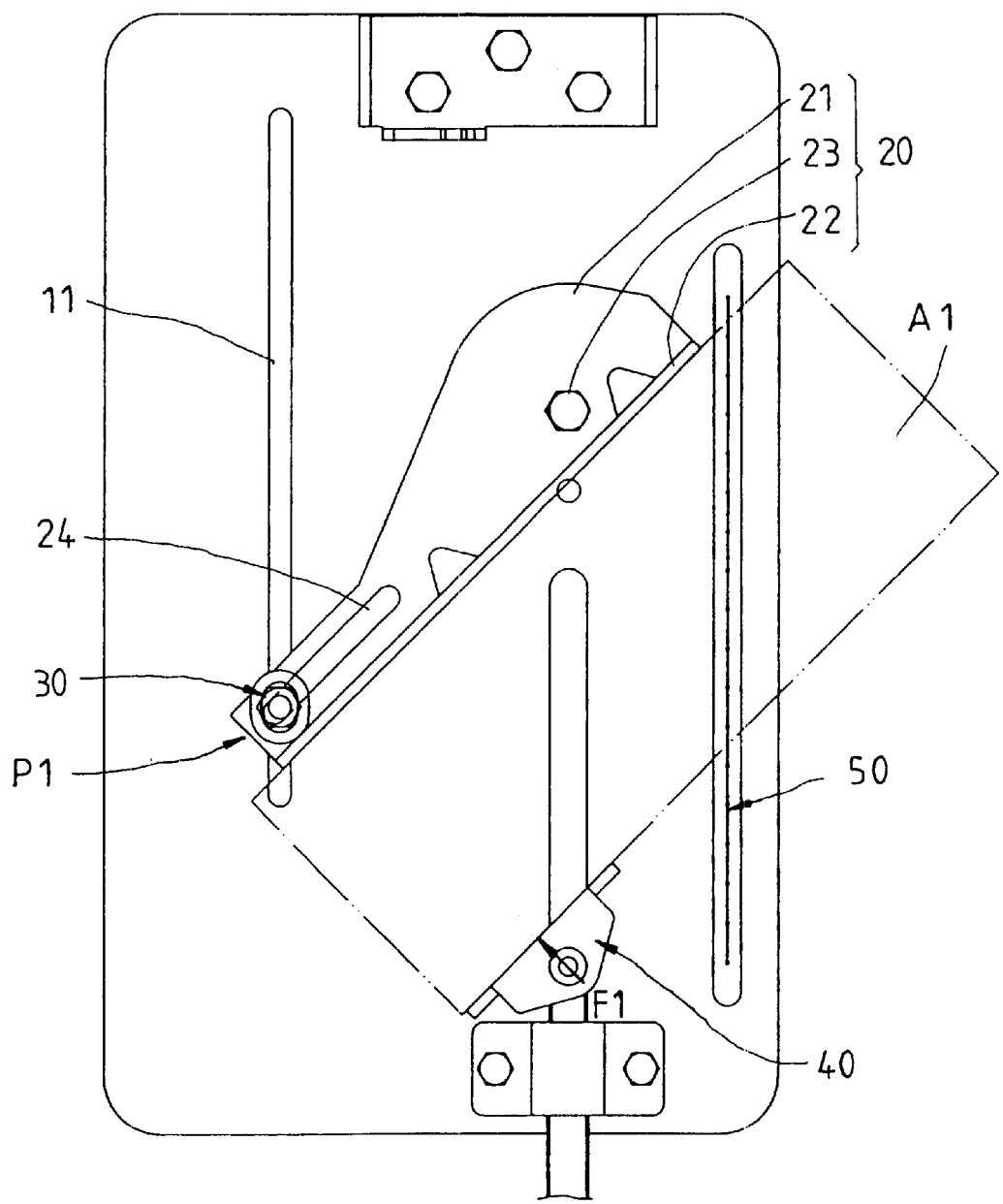
FIG. 3 is the slanted sawing diagram of the better example of this invention mentioned above.

Please refer to FIG. 3. Adjust the block (20) to a pre-set angle to exert a clipping force F1 onto item A1. When the angle of the block (20) becomes more slanted, the pressure-exerting arm formed between the block (20) and the pivotal shaft (23) will also increase. However, when the block (20) is placed in a slanted manner, the lead screw (30) will be adjusted along the lead trough (11) to a position P1 and screwed tightly as well. The lead screw (30) is located at the outer end of the sliding trough (24) and this lengthens the distance from the lead screw (30) to the pivotal screw (23). Similarly, the pressure-resisting arm formed between them will increase. When pressure-exerting arm and pressure-resisting arm increase or counteract, the force (F1) will not be able to turn the block (20) easily. This will ensure item A1 to be firmly fixed in between the block (20) and the top pusher (40). Such a design indeed improves the imbalance between pressure-exerting arm and the pressure-resisting arm on traditional clips that cannot take big clipping forces.

Figure 4:
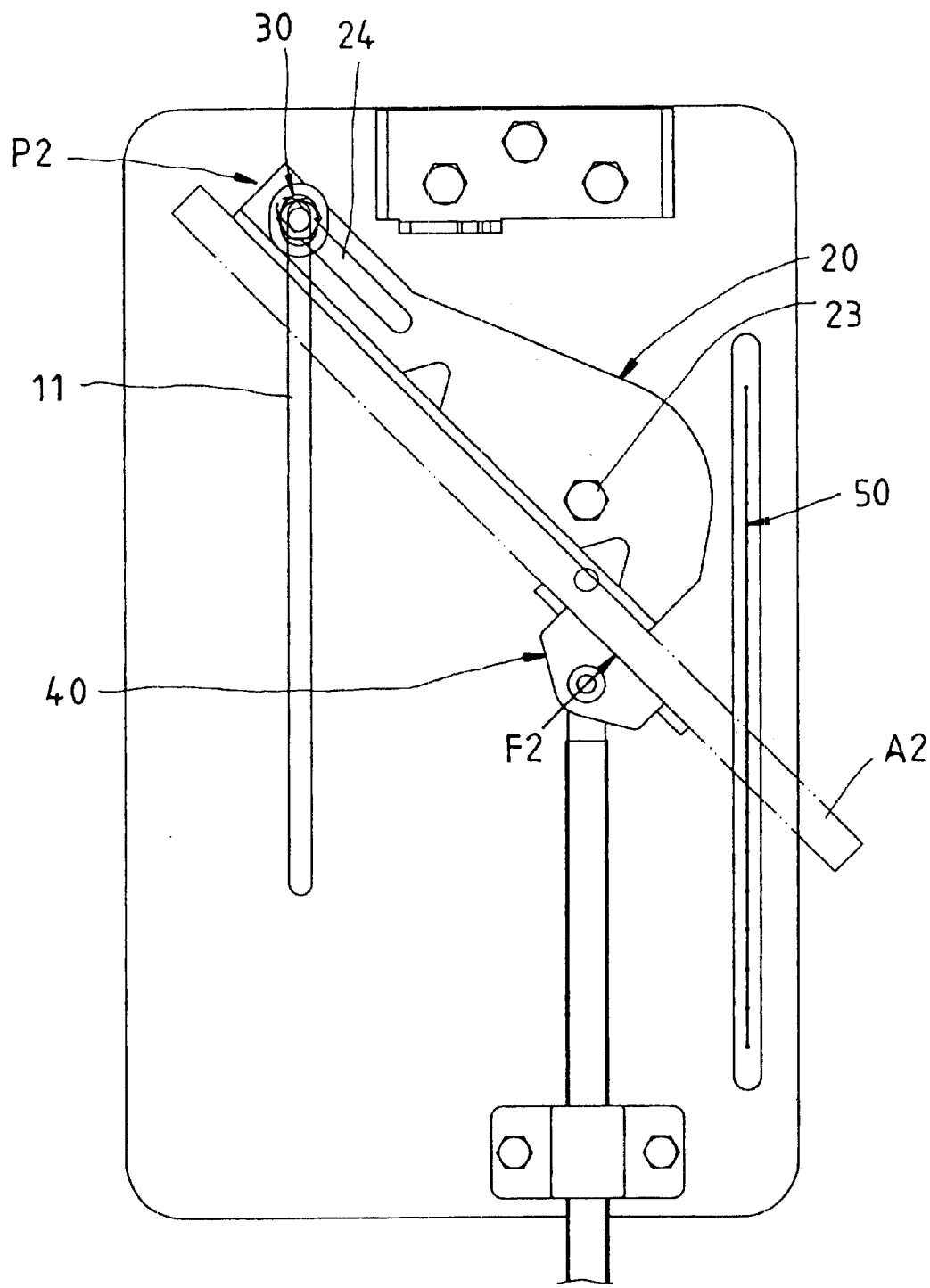
FIG. 4 is the sawing diagram of the better example of this invention mentioned above from another direction.

Please refer to FIG. 4 again. The block (20) of this improved saw clip could be placed from another direction for the placement of item A2. When this happens, the lead screw is adjusted to P2 position on the leading trough (11). Because it is located at the outer end of the sliding trough (24), when the lead screw is screwed tightly, it will be pushed against the block (20). The pressure-resisting arm will increase to work against the force F2 so that item A2 can be fixed firmly to its position.

In short, compared with other similar products, this invention shows a lot of improvement and practicality. Moreover, it is very convenient to use. Since there are no similar inventions to be seen or used before this invention files for its application and this invention has met the basic requirement of patent application, the application has been submitted.

The details mentioned above are only a better example of the invention in use. All the structural changes covered by the manual of this invention and the scope of patent will be included as part of this patent.

What is claimed is:

1. A miter guide device for a table saw comprising:

a worktable;

a saw blade extending up through a first slot in the worktable;

a guide block rotatably engaged on a pivot fixed to the worktable located at one side of the saw blade;

a second slot in the worktable located at the one side;

the guide block having a third slot spaced apart from the pivot crossing over the second slot;

a lead screw slidably engaged in the second and third slots;

lock means on the lead screw for fixing the lead screw at a selected position in the second and third slots when tightened; and a pusher slidable in a fourth slot;

wherein a workpiece can be held against the block by the pusher at selected angles to the saw blade after sliding the lead screw in the second and third slots to produce a selected angle and then tightening the lock nut to fix the lead screw in the second and third slots.

2. The miter guide according to claim 1, wherein the first, second and third slots are parallel to each other.

3. The miter guide according to claim 1, wherein the block has a blocking wall for engaging the workpiece.

4. The miter guide according to claim 1, wherein the pivot is located between the first and second slots.

5. The miter guide according to claim 1, wherein the pivot extends through a mid-section of the block.

6. The miter guide according to claim 1, wherein the pusher is rotatably engaged at an end of a lead spiral shaft slidably engaged to the work table.

7. The miter guide according to claim 6, wherein the pivot lies on an extension of a longitudinal axis of the head spiral shaft.

* * * * *